3,580,973
POLYOXYMETHYLENE-FORMAL-CONTAINING
POLYESTER BLOCK POLYMER
Daniel M. Kennedy, Jr., East Brunswick, and Carl Naeher
Zellner, Berkeley Heights, N.J., assignors to Celanese
Corporation, New York, N.Y.
No Drawing. Filed Dec. 18, 1967, Ser. No. 691,160
Int. Cl. C08g 17/06, 39/10, 51/58
U.S. Cl. 260—860
8 Claims

ABSTRACT OF THE DISCLOSURE

A novel process for the production of stabilized oxymethylene polymers is presented wherein a polyoxymethylene-polyester block polymer is prepared by reacting a linear, formal-containing polyester with trioxane under trioxane polymerization conditions.

---

The present invention relates to polyoxymethylene-polyester block polymers, and to their preparation.

Moldable oxymethylene polymers having recurring oxymethylene groups or units ($-CH_2O-$) are of commercial interest because of their attractive physical and chemical properties. As is well known in the art, one method for preparing such polymers is to polymerize trioxane, a cyclic trimer of formaldehyde. In some instances, however, it is desirable to modify the properties of the homopolymer, especially with respect to strength, solvency, crystallinity, and thermal stability. One of the chief ways for achieving such a modification is to copolymerize the trioxane with other compounds, for example, cyclic ethers containing at least two adjacent carbon atoms as is disclosed in U.S. Pat. No. 3,027,352 by Cheves T. Walling et al., assigned to the Celanese Corporation of America. The degree of modification of trioxane homopolymer properties will depend on the character and the amount of the comonomer used.

The primary object of the present invention is to provide an additional method for modifying the properties of oxymethylene polymers, and the products resulting therefrom. Other objects will appear hereinafter.

The objects of the present invention are accomplished by a polyoxymethylene-polyester block polymer, which is prepared by reacting a linear, formal-containing polyester with trioxane under trioxane polymerization conditions.

The products of the present invention are block polymers wherein the polymer chain comprises at least one segment or block of recurring oxymethylene units or groups bonded directly to at least one segment or block of recurring linear ester units or groups. Such block polymers are not to be confused with random copolymers.

The term "linear, formal-containing polyester" as used throughout the specification and claims means polyesters containing at least one non-successively recurring formal linkage ($-O-CH_2-O-$) in the ester polymer chain. The formal link may be at any position in the ester polymer chain including the ends thereof. Any of the well known linear or aliphatic polyesters, as hereinafter more fully described, may be used in the present invention.

The formation of the polyoxymethylene-polyester block polymer of the present invention is typically represented as follows:

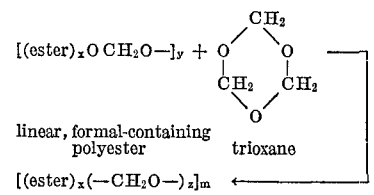

$[(ester)_x(-CH_2O-)_z]_m$

Block polymer

In the above formulas $x$ and $z$ are each greater than one, e.g., 2 to 1000 or more, and $y$ and $m$ are each at least one, and normally are each greater than one, e.g., 2 to 1000 or more.

Linear, formal-containing polyester preparation

The linear, formal-containing polyester may be prepared by reacting together an aliphatic dicarboxylic acid, an aliphatic dihydric alcohol, and a formal-containing compound.

The aliphatic dicarboxylic acid as used in the present invention is meant to include aliphatic dicarboxylic acids and mono- or di-alkyl esters thereof, the alkyl group containing from about 1 to 4 carbon atoms; and the maximum number of carbon atoms in the dicarboxylic acid or ester thereof being from about 2 to 18.

Suitable saturated or unsaturated aliphatic dicarboxylic acids which may be used in the present invention include, for example, maleic, fumaric, mesaconic, citraconic, itaconic, oxalic, malonic, succinic, glutaric, adipic, pimelic, suberic, azelaic, sebacic, and pyrotartaric acids. Mixtures of the above acids and/or the alkyl esters thereof may also be used. The preferred acids and esters are maleic acid, oxalic acid, sebacic acid, and dimethyl sebacate.

The aliphatic dihydric alcohols used in the present invention include those alcohols having up to about 8 carbon atoms per molecule such as ethylene glycol, propylene glycol, 1,2-butylene glycol, 2,3-butylene glycol, trimethylene glycol, tetramethylene glycol, pentamethylene glycol, hexamethylene glycol, heptamethylene glycol, octamethylene glycol, diethylene glycol, triethylene glycol, and tetraethylene glycol. Preferably, ethylene glycol is used.

The formal-containing compound which may be used in the present invention is selected from the group consisting of (a) paraformaldehyde,
(b) bis (2-hydroxyethoxy) methane, and
(c) dialkyl formals having from 3 to 10 carbon atoms per molecule.

Suitable dialkyl formals are dimethyl, diethyl, di-n-propyl, di-n-butyl, and di-isobutyl formal. Preferably, bis (2-hydroxyethoxy) methane is used.

The linear, formal-containing polyester may be prepared by using any of the well-known polyester polymerization catalysts such as sodium, and polyester polymerization conditions of temperature, pressure, and the like.

The polyester polymerization reaction may be conducted in the presence of an inert solvent such as a hydrocarbon, which may be aromatic (e.g., benzene, toluene or xylene), cycloaliphatic (e.g., cyclohexane or methyl cyclohexane) or aliphatic (e.g., hexane, pentane, or octane).

Normally, polymerization of the reaction mixture of dicarboxylic acid, dihydric alcohol, and formal-containing compound is initiated by heating the reaction mixture, with stirring, at a temperature in the range of from about 150 to 250° C. After substantial polymerization has taken place, as shown by a thickening of the reaction mixture, any solvent that is present or any volatile by-products that are formed such as methanol are preferably removed from the viscous mixture (as by distillation at sub-atmospheric pressures) and the degree of polymerization of the formal-containing polyester increased by further heating. The further heating may be effected, for example, at a low pressure, preferably below about 100 mm. Hg absolute (e.g., in the range of about 0.1 to 25 mm. Hg absolute). The temperature in the final chain-extension stage is usually in the range of from about 170 to 300° C., preferably from about 180 to 230° C. Desirably, during the heating treatments the reaction mixture is maintained under an inert atmosphere such as nitrogen.

Any amount of formal-containing compound may be reacted with the dicarboxylic acid and the dihydric alcohol as long as the resulting linear, formal-containing polyester contains at least one non-successively recurring formal linkage per molecule. Normally, the formal-containing polyester contains in the range of from about 1 to 20 mol percent of non-successively recurring formal linkages, and the remainder recurring ester units.

Polyoxymethylene-polyester block polymer formation

After the formation of the linear, formal-containing polyester it is reacted with trioxane under conventional trioxane polymerization conditions to yield a block polymer containing at least one segment of recurring oxymethylene units bonded to at least one segment of recurring ester units.

The formation of the block polymer may be carried out in the manner described in Belgian Pat. 625,781, or Belgian Pat. 624,203 (corresponding to S. African Pat. 4468/62). In this reaction the catalyst is advantageously a trioxane polymerization catalyst, preferably a cationic catalyst. Particularly good results are obtained when the catalyst is boron fluoride, as such or in the form of a complex thereof with an ether or in the form of an activatable aryldiazonium fluoborate, but any of the other catalysts set forth in the aforementioned Belgian patents may be employed. The proportion of catalyst may be advantageously in the range of about 10 to 1000 parts per million, based on the weight of trioxane.

The reaction is preferably carried out in the liquid state, e.g., in molten trioxane, or in solution in an inert solvent. Any of the reaction techniques and conditions described in the aforementioned Belgian patents may be used.

Advantageously, the reaction temperature is in the range of from about −70 to +150° C., preferably in the range of about 50 to 90° C., and the reaction mixture is substantially anhydrous.

The relative proportions of trioxane and formal-containing polyester used to form the block polymer may be varied, depending on the nature of the polyester and of the desired block polymer. Preferably, the proportions of trioxane and polyester reacted or polymerized are such that the resulting block polymer contains in the range of from about 60 to 99.9 mol percent oxymethylene units, and the remainder ester units.

The resulting block polymer generally contains at least one relatively unstable hydroxy oxymethylene group ($-OCH_2OH$) at the end of a terminal polyoxymethylene segment or block. This unstable group may be removed, to improve the stability of the block polymer product, by suitable thermal treatment, preferably by reaction with water or an alcohol. A suitable thermal treatment is that described in U.S. Pat. 3,103,499, while a suitable thermal treatment in the presence of water or an alcohol is disclosed in Indian patent 76,364 (corresponding to French patent 1,287,151). Alternatively, the unstable end group may be stabilized by treatment with suitable "end-capping" reagents which convert the hydroxyl group to a more resistant group, such as an ester group (produced by reaction with acid anhydrides, e.g., acetic anhydride to form an acetate end group) or ether group (as by reaction with dimethylsulfate to form a methyl ether end group).

The polyoxymethylene-polyester block polymers may also be mixed with suitable stabilizers of a type well known to the art. Among such stabilizers are antioxidants, such as phenolic compounds, and particularly alkylene bisphenols, as well as, or together with, amidines such as cyanoguanidine, melamine or N-diethylmelamine; polyamides such as the synthetic linear polyamides, e.g., nylons; or epoxy compounds such as the condensation product of epichlorhydrin and bisphenol A.

The block polymer products obtained in accordance with the present invention may be molded, as by injection or compression molding, to produce useful shaped articles, e.g., toys, cups, automobile parts, containers, etc., may be cast or extruded to produce films suitable for wrapping or packaging purposes, and may be melt-spun, or dry-spun from solution, to produce useful textile fibers.

The present invention is additionally illustrated by the following example:

EXAMPLE

The following materials were added to a 250 ml. flask and maintained therein under an inert atmosphere of nitrogen gas:

103.5 gm. dimethyl sebacate
55.8 gm. ethylene glycol
6.12 gm. bis(2-hydroxyethoxy)methane, and
0.3 gm. sodium (catalyst)

The above materials were heated, with stirring, at 180° C., for 3 hours. At the conclusion of the heating period methanol, which had formed during the polymerization reaction, was distilled off.

The pressure in the flask was then gradually reduced to about 0.15 mm. and the reaction mixture was heated to and maintained at 190° C. for about 1 hour. The temperature was then raised to 215° C. for 2 additional hours of heating, at the conclusion of which the vacuum was broken by the addition of nitrogen and 0.2 gm. of sodium were added. The pressure in the flask was again reduced to about 0.15 mm. Hg and the polymerization reaction continued for 1½ hours at about 190° C. The resulting polymerized product was then cooled, recovered, and dissolved in benzene. The benzene solution was filtered through a Gelman filter under pressure, and the polymerized product precipitated into petroleum ether. The resulting linear, formal-containing polyester was subsequently washed with water and dried.

About fifty gm. of the above polyethylene sebacate formal polyester were dissolved in 160 ml. of dry benzene in a 500 ml. flask equipped with a stirrer, the materials being maintained therein under an inert atmosphere of nitrogen. After removing, by distillation, 40 ml. of the benzene in order to dry the system, 126.7 gm. of trioxane were added. The trioxane-polyester solution was cooled to about 65° C. whereupon boron trifluoride etherate, in 200 p.p.m. increments, was added until polymerization was initiated, polymerization being accompanied by an exotherm and solidification.

The polymerized product was allowed to stand for about 12 hours at room temperature, after which it was washed with benzene containing triethylamine. About 127 grams of polyoxymethylene-polyester block polymer was recovered.

The block polymer product was further treated to remove any unstable oxymethylene units and to remove any ester units that might be contained in admixture therewith, whereby a final block polymer product containing 22.8 weight percent ester units was obtained. This block polymer product had good thermal stability and an inherent viscosity in parachlorophenol at 60° C. of 0.75.

The principle, preferred embodiment, and mode of operation of the present invention have been described in the foregoing specification. However, it should be understood that the invention which is intended to be protected herein, may be practiced otherwise than as described without departing from the scope of the appended claims.

What is claimed is:

1. In a process for the production of polyoxymethylene-polyester block polymer of the type wherein trioxane is reacted under trioxane polymerization conditions, with a linear polyester to form said block polymer the improvement which comprises, reacting said trioxane with a linear formal-containing aliphatic dicarboxylic acid-aliphatic dihydric alcohol condensation polyester containing from about 1 to 20 mole percent of non-successively recurring formal linkages (—O—CH$_2$—O—) in the ester polymer chain, and the remainder recurring ester units.

2. The process of claim 1 wherein the resulting block polymer contains in the range of from about 60 to 99.9 mol percent oxymethylene units, and the remainder ester units.

3. The process of claim 1 wherein the linear, formal-containing polyester is a polymerization product of dimethylsebacate, ethylene glycol, and bis(2-hydroxyethoxy) methane.

4. A process for preparing a polyoxymethylene-polyester block polymer, which process comprises:
   (a) reacting together an aliphatic dicarboxylic acid, an aliphatic dihydric alcohol, and a formal-containing compound selected from the group consisting of
       (i) paraformaldehyde,
       (ii) bis(2-hydroxyethoxy) methane, and
       (iii) dialkyl formals having from 3 to 10 carbon atoms per molecule
   to form a linear, formal-containing polyester containing from about 1 to 20 mole percent of nonsuccessively recurring formal linkages

   (—O—CH$_2$—O—)

in the ester polymer chain, and the remainder recurring ester units, and (b) reacting said polyester with trioxane under trioxane polymerization conditions to yield said block polymer.

5. The process of claim 4 wherein the linear, formal-containing polyester is soluble in trioxane.

6. The process of claim 4 wherein the aliphatic dicarboxylic acid is a dialkyl ester thereof, the alkyl group containing from about 1 to 4 carbon atoms.

7. The process of claim 4 wherein dimethylsebacate, ethylene glycol, and bis(2-hydroxyethoxy) methane are reacted to form the linear, formal-containing polyester, which polyester contains in the range of from about 1 to 20 mol percent of non-successively recurring formal linkages, and the remainder recurring ester units.

8. The process of claim 4 wherein the linear, formal-containing polyester is reacted with trioxane at a temperature in the range of from about —70 to +150° C., in the presence of a cationic catalyst to yield the block polymer comprising in the range of from about 60 to 99.9 mol percent oxymethylene units, and the remainder ester units.

References Cited

UNITED STATES PATENTS

| | | | |
|---|---|---|---|
| 3,204,012 | 8/1965 | Equchi et al. | 260—67 |
| 3,218,295 | 11/1965 | Cline | 260—67 |
| 3,310,608 | 3/1967 | Matsubayashi et al. | 260—67 |
| 3,355,514 | 11/1967 | Van De Walle et al. | 260—860 |
| 3,364,157 | 1/1968 | Halek et al. | 260—860 |
| 3,346,663 | 10/1967 | Kern et al. | 260—67 |

FOREIGN PATENTS

| | | | |
|---|---|---|---|
| 729,727 | 3/1966 | Canada | 260—860 |

OTHER REFERENCES

Chem. Abst., vol. 61: 5815c, "Polyformaldehyde Resins" (Houilleres).

WILLIAM H. SHORT, Primary Examiner

E. WOODBERRY, Assistant Examiner

U.S. Cl. X.R.

260—67, 75